(12) United States Patent
Shah et al.

(10) Patent No.: US 12,147,582 B2
(45) Date of Patent: Nov. 19, 2024

(54) VALIDATION BASED AUTHENTICATED STORAGE IN DISTRIBUTED LEDGER

(71) Applicant: ACCENTURE GLOBAL SOLUTIONS LIMITED, Dublin (IE)

(72) Inventors: Vaibhav Shah, Pune (IN); Hirendra Singh Parihar, Indore (IN); Nikhil Prakash Bhandari, Pune (IN); Ankit Gupta, Phursungi (IN); Akif Alam Khan, Aurangabad (IN); Anu Saxena, Uttarakhand (IN); Ramesh Peetha, Guntur (IN); Shabbar Ali Ghadiyali, Banswara (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 355 days.

(21) Appl. No.: 17/703,788

(22) Filed: Mar. 24, 2022

(65) Prior Publication Data
US 2023/0306139 A1 Sep. 28, 2023

(51) Int. Cl.
*G06F 21/64* (2013.01)
*G06F 16/215* (2019.01)
*G06F 16/27* (2019.01)
*H04L 9/40* (2022.01)

(52) U.S. Cl.
CPC ............ *G06F 21/64* (2013.01); *G06F 16/215* (2019.01); *G06F 16/27* (2019.01); *H04L 63/08* (2013.01)

(58) Field of Classification Search
CPC ........ G06F 21/64; G06F 16/215; G06F 16/27; H04L 63/08
See application file for complete search history.

(56) References Cited

U.S. PATENT DOCUMENTS

| | | | | |
|---|---|---|---|---|
| 5,987,423 A | * | 11/1999 | Arnold | G06F 16/289 705/14.23 |
| 8,433,604 B2 | * | 4/2013 | Rai | G06Q 30/0283 705/400 |
| 2003/0195810 A1 | * | 10/2003 | Raghupathy | G06Q 30/0283 705/20 |
| 2012/0059732 A1 | * | 3/2012 | Dakka | G06Q 30/08 705/26.4 |
| 2018/0204213 A1 | * | 7/2018 | Zappier | H04L 63/08 |
| 2021/0216509 A1 | * | 7/2021 | Jayanthi | G06F 16/1734 |
| 2021/0406474 A1 | * | 12/2021 | Jalali | G06F 40/30 |
| 2022/0012732 A1 | * | 1/2022 | Unagami | G06Q 20/401 |

\* cited by examiner

*Primary Examiner* — Etienne P Leroux
(74) *Attorney, Agent, or Firm* — Mannava & Kang, P.C.

(57) ABSTRACT

Systems and methods for facilitating validation of datasets are disclosed. A system may include a processor. The system may include a data validator implemented via the processor to receive an input dataset including a component metadata. The data validator may perform, using an validation model and through a rules engine, validation of information in the component metadata to obtain a validation dataset. The validation may enable to predict at least one invalid feature in the component dataset. The system may include an insight generator implemented via the processor to generate, based on the validation datasets, automated insights pertaining to mitigation of the at least one invalid feature. In an embodiment, the automated insights may be stored in a distributed ledger to facilitate an authenticated storage of the automated insights. The authenticated storage may be facilitated by a network comprising a plurality of nodes.

20 Claims, 15 Drawing Sheets

| VALID | VALID (PREDICTION) | O/P FOR THRESHOLD 0.6 |
|---|---|---|
| 0 | 0.5 | 0 |
| 1 | 0.9 | 1 |
| 0 | 0.7 | 1 |
| 1 | 0.7 | 1 |
| 1 | 0.3 | 0 |
| 0 | 0.4 | 0 |
| 1 | 0.5 | 0 |

| RECALL = 1/2 | PRECISION = 2/3 | ACCURACY = 4/7 |

|  | | Predicted Class | |
|---|---|---|---|
|  | | Valid (1) | Invalid (0) |
| Actual Class | Valid (1) | TP = 450 | FN = 10 |
|  | Invalid (0) | FP = 21 | TN = 30 |

Total = 511

TN: True-Negative
FN: False-Negative
FP: False-Positive
TP: True-Positive

| Name | Type |
|---|---|
| ▼ Business-TV-Bonus-Pak_AttributeAssignments.json | JSON File |
| ▼ Business-TV-Bonus-Pak_DataPack.json | JSON File |
| ▼ Business-TV-Bonus-Pak_DecompositionRelationship.json | JSON File |
| ▼ Business-TV-Bonus-Pak_ParentKey.json | JSON File |
| ▼ Business-TV-Bonus-Pak_PriceBookEntries.json | JSON File |
| ▼ Business-TV-Bonus-Pak_PriceListEntries.json | JSON File |
| ▼ Business-TV-Bonus-Pak_ProductChildItems.json | JSON File |

602 → (points to table above)

604 →
```
{
   "%NAMESPACE%__AttributeRules__c": "",
   "%NAMESPACE%__CategoryData__c" : "",
   "%NAMESPACE%__ClassId__c" : "", "%NAMESPACE%__DecompositionRelationship__c" : " | ", "%NAMESPACE%__DefaultImageId__c": "",
   "%NAMESPACE%__EndOfLifeDate__c": {...
}
```

| Name | Type |
|---|---|
| ▼ Business-TV-Bonus-Pak_AttributeAssignments.json | JSON File |
| ▼ Business-TV-Bonus-Pak_DataPack.json | JSON File |
| ▼ Business-TV-Bonus-Pak_DecompositionRelationship.json | JSON File |
| ▼ Business-TV-Bonus-Pak_ParentKey.json | JSON File |
| ▼ Business-TV-Bonus-Pak_PriceBookEntries.json | JSON File |
| ▼ Business-TV-Bonus-Pak_PriceListEntries.json | JSON File |
| ▼ Business-TV-Bonus-Pak_ProductChildItems.json | JSON File |

606 → (points to table above)

608 →
```
{
   "%NAMESPACE%__AttributeRules__c": "",
   "%NAMESPACE%__CategoryData__c" : "",
   "%NAMESPACE%__ClassId__c" : "",
   "%NAMESPACE%__DecompositionRelationship__c" :
   "Business-TV-Bonus-Pak_DecompositionRelationships.json",
   "%NAMESPACE%__DefaultImageId__c": "",
   "%NAMESPACE%__EndOfLifeDate__c": {...
}
```

FIG. 6A

VALIDATION BASED AUTHENTICATED STORAGE IN DISTRIBUTED LEDGER

BACKGROUND

Product and/or service based organizations may utilize various digital tools to perform their operations, such as, for example, sales operation. Existing tools such as, for example, configure, price, quote (CPQ) based implementation may be utilized in accomplishing several sales related tasks. For example, the tasks may include digital sales operations, generation of quotes, managing sales orders and other tasks pertaining to sales and marketing of product and/or service. This may be applicable in case of various fields, such as, for example, travel, hospitality, health care, banking, insurance, pharmaceuticals, electronic devices/systems, and other such fields.

The existing digital tools such as, CPQ tools may include the use of various metadata files that may describe components related to these operations. The metadata files may be used to enable implementation of the various tasks by the digital tools. However, it may not be possible to test the metadata files for different environments/implementation. Thus, an execution of this metadata may be restricted to specific environments or may lead to errors in untested environments at deployment stage. The conventional tools may fail to identify the errors or invalid features in the component metadata prior to deployment thus leading to loss of time and capital. Further, the manual identification or mitigation of errors may be time-consuming and may lack operational efficiency. Furthermore, the conventional tools may fail to keep a safe and authenticated record of identified errors and/or mitigation. Therefore, there may be no such reference available in case of future mitigation of the errors in the metadata files, thus requiring multiple iterations for deploying such tools in different environments.

SUMMARY

An embodiment of present disclosure includes a system including a processor. The processor may be coupled with a memory, wherein the memory stores instructions to be executed by the processor. The system may include a data validator implemented via the processor. The data validator may receive an input dataset including a component metadata. The component metadata may include information pertaining to a feature corresponding to each component of a plurality of components associated with a product or a service. The data validator may perform, using validation model and through a rules engine, validation of the information in the component metadata to obtain a validation dataset. The validation may be performed by assessing the feature with respect to a corresponding pre-defined rule stored in the rules engine. The validation may enable to predict at least one invalid feature in the component dataset. The system may include an insight generator implemented via the processor to generate, based on the validation datasets, automated insights pertaining to mitigation of the at least one invalid feature. In an embodiment, the automated insights may be stored in a distributed ledger to facilitate an authenticated storage of the automated insights. The authenticated storage may be facilitated by a network comprising plurality of nodes.

Another embodiment of the present disclosure may include a method for facilitating validation of datasets. The method includes a step of receiving an input dataset including a component metadata. In an embodiment, the component metadata may include information pertaining to a feature corresponding to each component of a plurality of components associated with a product or a service. The method may include a step of performing, by the processor, validation of the information in the component metadata to obtain a validation dataset. In an example embodiment, the validation may be performed through assessing the feature with respect to a pre-defined rule stored in the rules engine. The validation may enable to identify at least one invalid feature in the component dataset. The method may include a step of generating, by the processor, based on the validation datasets, automated insights pertaining to mitigation of the at least one invalid feature. In an example embodiment, the automated insights may be stored in a distributed ledger to facilitate an authenticated storage of the automated insights. The authenticated storage may be facilitated by a network comprising plurality of nodes.

Yet another embodiment of the present disclosure may include a non-transitory computer readable medium comprising machine executable instructions that may be executable by a processor to receive an input dataset including a component metadata. In an embodiment, the component metadata may include information pertaining to a feature corresponding to each component of a plurality of components associated with a product or a service. The processor may perform validation of the information in the component metadata to obtain a validation dataset. In an example embodiment, the validation may be performed through assessing the feature with respect to a pre-defined rule stored in the rules engine. The validation may enable to identify at least one invalid feature in the component dataset. The processor may generate, based on the validation datasets, automated insights pertaining to mitigation of the at least one invalid feature. In an example embodiment, the automated insights may be stored in a distributed ledger to facilitate an authenticated storage of the automated insights. The authenticated storage may be facilitated by a network comprising plurality of nodes.

BRIEF DESCRIPTION OF DRAWINGS

FIGS. 5A-5C illustrate exemplary representations for evaluation of classification model based on confusion matrix, according to an example embodiment of the present disclosure.

FIGS. 6A-6C illustrate exemplary representations showing examples for mitigation of the invalid feature based on insights, according to an example embodiment of the present disclosure.

DETAILED DESCRIPTION

Figure 1:
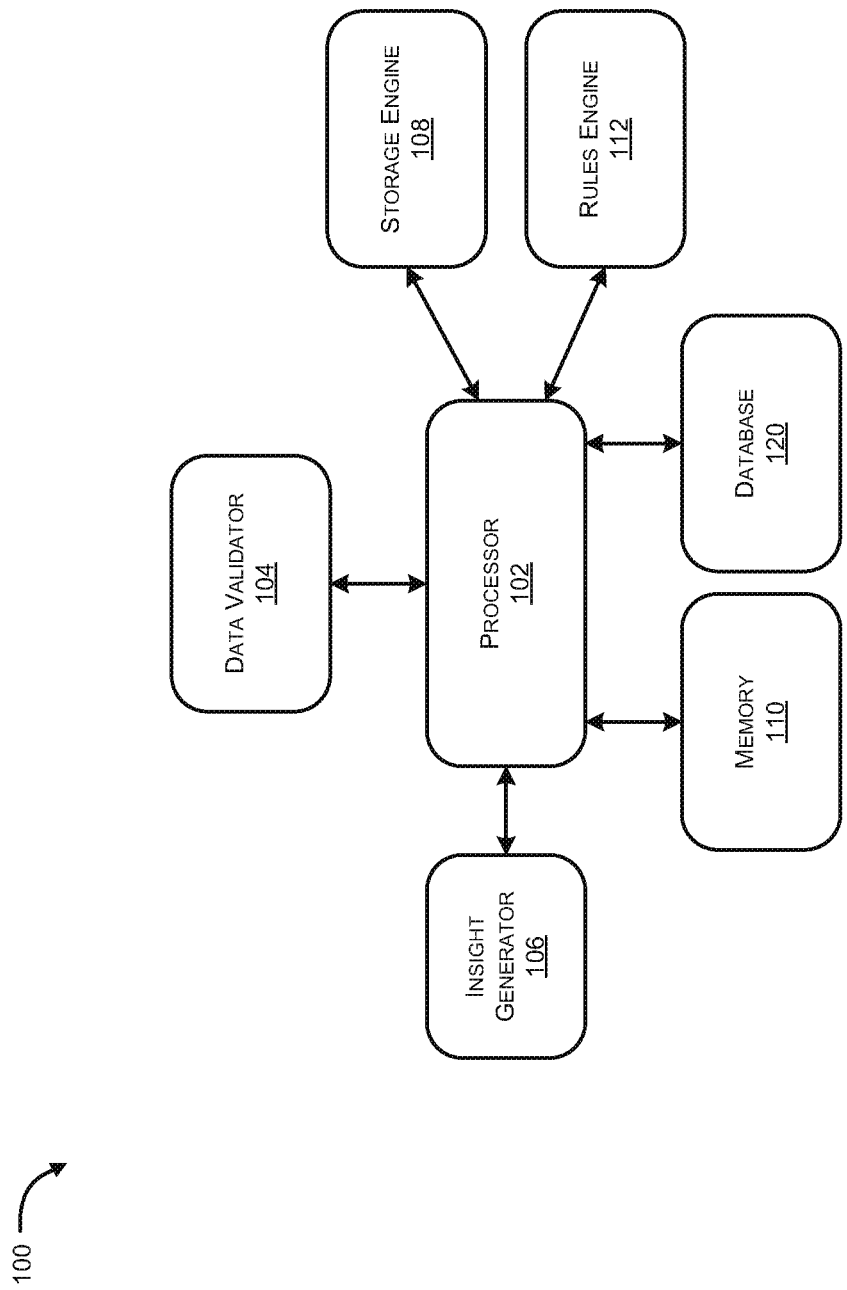
FIG. 1 illustrates a system for facilitating validation of datasets for authenticated storage in a distributed ledger, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "a" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

Overview

Various embodiments describe providing a solution in the form of a system and a method for facilitating validation of datasets for authenticated storage in a distributed ledger. The system may include a processor coupled with a memory, wherein the memory may store instructions to be executed by the processor. The processor may include a data validator. The data validator may receive an input dataset including a component metadata. The component metadata may include information pertaining to a feature corresponding to each component of a plurality of components associated with a product or a service. The data validator may perform validation of the information in the component metadata using a validation model and through a rules engine. The validation may result in a validation dataset. The validation may be performed by assessing the feature with respect to a corresponding pre-defined rule stored in the rules engine. In an embodiment, the validation enables to predict at least one invalid feature in the component dataset. The system may include an insight generator, which may be implemented via the processor. The insight generator may generate, automated insights based on the validation datasets. The automated insights may pertain to mitigation of the at least one invalid feature. In an embodiment, the automated insights may be stored in a distributed ledger to facilitate an authenticated storage of the automated insights. The authenticated storage may be facilitated by a network comprising a plurality of nodes.

Exemplary embodiments of the present disclosure have been described in the framework for validation of datasets for authenticated storage in a distributed ledger. The embodiments may describe a system and a method to perform validation of datasets, such as, for example, metadata to obtain automated insights that may be stored in the distributed ledger, such as, for example, in a blockchain implementation. The validation may enable to identify validation errors in advance or prior to deployment. For example, in a sales operation, existing tools such as, for example, configure, price, quote (CPQ) operation may be utilized for automating information such as availability/pricing of various product/schemes or their combination with other products, automating control of discounts and approval and other such steps. However, the CPQ tools may include metadata pertaining to these aspects (or components) that may not be tested for different environments/implementation. This may limit their usage only to certain environments or may lead to errors in such environments at deployment stage. However, using the system and method of the present disclosure, these potential errors may be identified in advance, thus saving considerable time and efforts. In addition, the systems and methods described herein may also enable to avoid delay in deployment and may facilitate automated insights indicating reasons for the invalid features/errors and/or a possible mitigation. Thus, the solution not only predicts possible errors in advance but may also guide towards a possible solution, thereby making the process faster and more efficient, especially when combined with digital tools such as, for example the CPQ based operation. Further, the identified errors/invalid features and/or the automated insights may be stored in the distributed ledger, such as, for example, a blockchain based implementation. As the storage may be authenticated based on approval from each node in a network, this may enable greater transparency and authenticity of CPQ operations. The system and method of the present disclosure may be applied to several applications that involve product/service based operations, such as, for example, digital sales operations, generation of quotes, managing sales orders and other such operations pertaining to sales and marketing of product and/or service. The system and method of the present disclosure may be applicable in several fields that involve data pertaining to availability, pricing, sales, marketing and other such operations for product/service including, but not limited to, travel, hospitality, health care, banking, insurance, pharmaceuticals, electronic devices/systems, and other such fields. In an example, some products or services may require generation of quotes or order completion and other such applications, wherein a metadata pertaining to the corresponding product/service may not be tested for deployment in every environment. This may lead to generation of errors at the deployment stage, which may not be desirable as it may cost time and efforts in addressing those errors. However, using the present system and disclosure, the possibility of such errors as well as insights for a possible remedy may be provided. One of ordinary skill in the art will appreciate that the present disclosure may not be limited to such applications. The system may also be integrated with existing CPQ tools such as, for example, Salesforce, Vlocity tools and/or other platforms pertaining to customer relationship management (CRM) enterprise resource planning (ERP) and other business technology. Several other advantages may be realized.

FIG. 1 illustrates a system 100 for facilitating validation of datasets for authenticated storage in a distributed ledger, according to an example embodiment of the present disclosure. The system 100 may be implemented by way of a single device or a combination of multiple devices that are operatively connected or networked together. The system 100 may be implemented in hardware or a suitable combination of hardware and software. The system 100 includes a processor 102. The processor may be coupled to at least one database 120 and a memory 110. The memory 110 may store instructions to be executed by the processor 102. The processor 102 may include a data validator 104, an insight generator 106, a storage engine 108 and a rules engine 112, wherein one or more functions may be implemented by mentioned components via the processor 102.

The system 100 may be a hardware device including the processor 102 executing machine readable program instructions to facilitate validation of datasets. Execution of the machine readable program instructions by the processor 102 may enable the proposed system to facilitate the validation of datasets. The "hardware" may comprise a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor 102 may include, for example, microprocessors, microcomputers, microcontrollers, digital signal processors, central processing units, state machines, logic circuits, and/or any devices that manipulate data or signals based on operational instructions. Among other capabilities, processor 102 may fetch and execute computer-readable instructions in a memory operationally coupled with system 100 for performing tasks such as metadata processing, input/output processing, generation of automated insights and/or any other functions. Any reference to a task in the present disclosure may refer to an operation being or that may be performed on data.

In an embodiment, the data validator 104 may receive an input dataset including a component metadata. The data validator 104 may perform validation of the information in the component metadata using a validation model and through the rules engine 112. The validation may result in a validation dataset. The validation may be performed by assessing the feature with respect to a corresponding pre-defined rule stored in the rules engine 112. In an embodiment, the validation enables to predict at least one invalid feature in the component dataset. The insight generator 106 may generate, automated insights based on the validation datasets. The automated insights may pertain to mitigation of the at least one invalid feature. For example, the insights may include a solution on how to rectify identified error/invalid feature. Thus, the implementation or the system 100 may not only identify the errors that may possibly occur at the later stage of deployment but may also facilitate to provide a possible solution to rectify the identified errors. In an example embodiment, the automated insights may be generated in a of a summarized story, which may be presented in various forms. For example, the summarized story may include statistical insights with respect to historical data. In another example, the summarized story may include at least one of descriptive text and graphical trend based projection. Various other forms of the automated insights may be generated. In an example embodiment, the summarized story may be generated by evaluating the validation dataset based on multiple perspectives.

In an embodiment, the automated insights may be stored in a distributed ledger to facilitate an authenticated storage of the automated insights. The authenticated storage may be facilitated by a network comprising a plurality of nodes. In an embodiment, the storage engine 108 may be implemented by the processor 102 to facilitate authenticated storage of the automated insights in the distributed ledger. In an example embodiment, the distributed ledger may pertain to a blockchain implementation including storage of the automated insights in a form of multiple authenticated blocks. The storage engine 108 may be instrumental in conveying the generated insights to the various nodes for recording in a blockchain. In an example, the authenticated storage may include an authentication of the automated insights by each node in the network so that the insights are rectified prior to storage. This may further improve the authenticity of information/solution being proposed for identified errors/invalid feature.

In an embodiment, the input dataset may include a component metadata. The component metadata may include information pertaining to a feature corresponding to each component of a plurality of components associated with a product or a service. The components may pertain to product/service type, a price, an attribute and an orchestration pertaining to at least one of the product and the service. The term "orchestration" may refer to automated sequence of generating quote, pricing, and/or fulfillment steps for processing an order. The orchestration may provide a sequence and other important information pertaining to forward and backward planning, solution to compensate for changes and status/availability of products. The term "feature" (corresponding to the component) may pertain to a characteristic or attribute pertaining to corresponding various component. For example, if the component may be "pricing", the corresponding features may pertain to "pricelist", "price book", "pricing template" and other such features. In another example, if the component may be "orchestration", the corresponding features may pertain to "orchestration item definition", "orchestration plan definition" and other features. Thus, the component metadata may include information pertaining to these features. For example, the metadata may describe combination of products that may qualify for a particular discount, such as, for example, combination of electronic product such as desktop and mouse may be available at a specific discounted price than the corresponding individual products. The component metadata may not be limited to such examples and various information pertaining to the product or service and/or the corresponding CPQ operations may be included in the component metadata.

Figure 2:
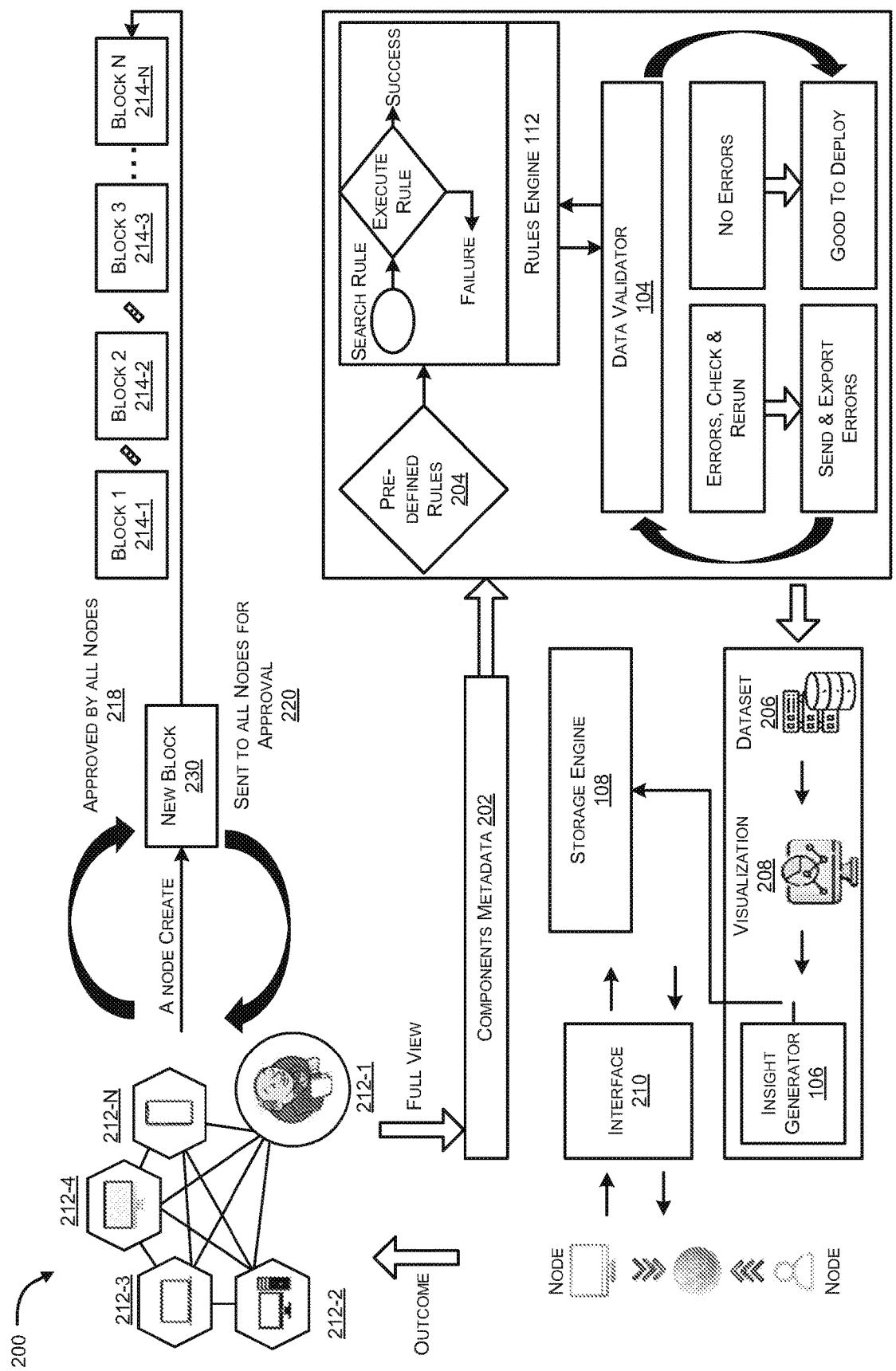
FIG. 2 illustrates an exemplary representation showing various stages involved in facilitating validation of input dataset and authenticated storage of corresponding insights in a distributed ledger, according to an example embodiment of the present disclosure.

FIG. 2 illustrates an exemplary representation 200 showing various stages involved in facilitating validation of input dataset and authenticated storage of corresponding insights in a distributed ledger, according to an example embodiment of the present disclosure. As illustrated in FIG. 2, an input dataset including the component metadata 202 may be received by the data validator 104. The data validator 104 may perform validation of the information in the component metadata to obtain a validation dataset. For example, the validation dataset may include details or information pertaining to an invalid feature in the component metadata. In an embodiment, using a validation model of the processor, the validation may be performed by assessing the feature (in the component dataset) with respect to a corresponding pre-defined rule stored in rules engine 112. As shown in FIG. 2, the pre-defined rule may be selected from multiple pre-defined rules 204 that may be pre-stored in the rules engine. For example, the multiple pre-defined rules 204 may be screened to search a relevant rule for a specific feature/component pertaining to a product/service. The data validator 102 may assess the feature (in the component dataset) with respect to the corresponding pre-defined rule to observe a success or failure. This may enable to identify a corresponding error or the invalid feature pertaining to the component metadata 202. In an embodiment, based on the validation, if no error or invalid feature is found, the system may deploy the component metadata and/or the corresponding tools. In an alternate embodiment, based on the validation, if an error or invalid feature is found, the data validator may re-assess the invalid feature by reiterating the validation, which may be used to send/export details pertaining to the invalid feature.

The resulting validation dataset may be sent to insight generator 106. Based on the validation dataset, the insight generator 106 may generate automated insights pertaining to mitigation of the at least one invalid feature. As illustrated in FIG. 2, the validation dataset (shown as dataset 206) may generate the automated insights by evaluating the validation dataset based on multiple perspectives. For example, prior to generating the automated insights, the validation dataset may be subjected to visualization 208 to facilitate assessing the validation dataset using the multiple perspectives. In an embodiment, the automated insights may be generated in a form of a summarized story. For example, the summarized story may include statistical insights with respect to historical data. In another example, the summarized story may include at least one of descriptive text and graphical trend based projection. The automated insights may mainly indicate about possible errors as well as possible remedy/recommendation to rectify the errors. For example, the automated insights may indicate an error, for example, such as a product pricing list missing, which may be mitigated by recommending or performing addition of the corresponding pre-stored file. In another example, the automated insights may indicate an error, for example, such as a missing product attribute, which may be mitigated by deleting the attribute. It may be appreciated that the examples/embodiments described herein are only exemplary and various other examples/embodiments may be possible.

As shown in FIG. 2, the automated insights/predictions may be sent by the insight generator 106 to storage engine 108. The storage engine 108 may be implemented by the processor to facilitate authenticated storage of the automated insights in a distributed ledger. In an example embodiment, the distributed ledger may pertain to a blockchain implementation including storage of the automated insights in a form of multiple authenticated blocks. The authenticated storage may be facilitated by a network comprising a plurality of nodes represented as 212-1, 212-2, 212-3, 212-4, ..., 212-N (collectively referred as 212). The storage engine 108 may facilitate a communication with each node via an interface 210 to enable sharing predictions/automated insights for the authenticated storage. For example, the storage engine 108 may interact with a cloud based platform for communication of the predictions/automated insights to the plurality of nodes 212 for authenticated storage of the predictions/automated insights in a corresponding distributed ledger. For example, the distributed ledger may be a blockchain including storage of the automated insights in a form of multiple authenticated blocks 214-1, 214-2, 214-3, ..., 214-N (collectively referred as 214). At 220 a node (from the plurality of nodes 212), for example, the node 212-1 may create a new block 230 based on the predictions/automated insights. The details pertaining to the new block 230 may be sent to all the remaining nodes 212 for approving the new block 230. At 218, based on approval received from the plurality of nodes 212, the new block 230 may be added to the blockchain including the blocks 214.

Figure 3A:
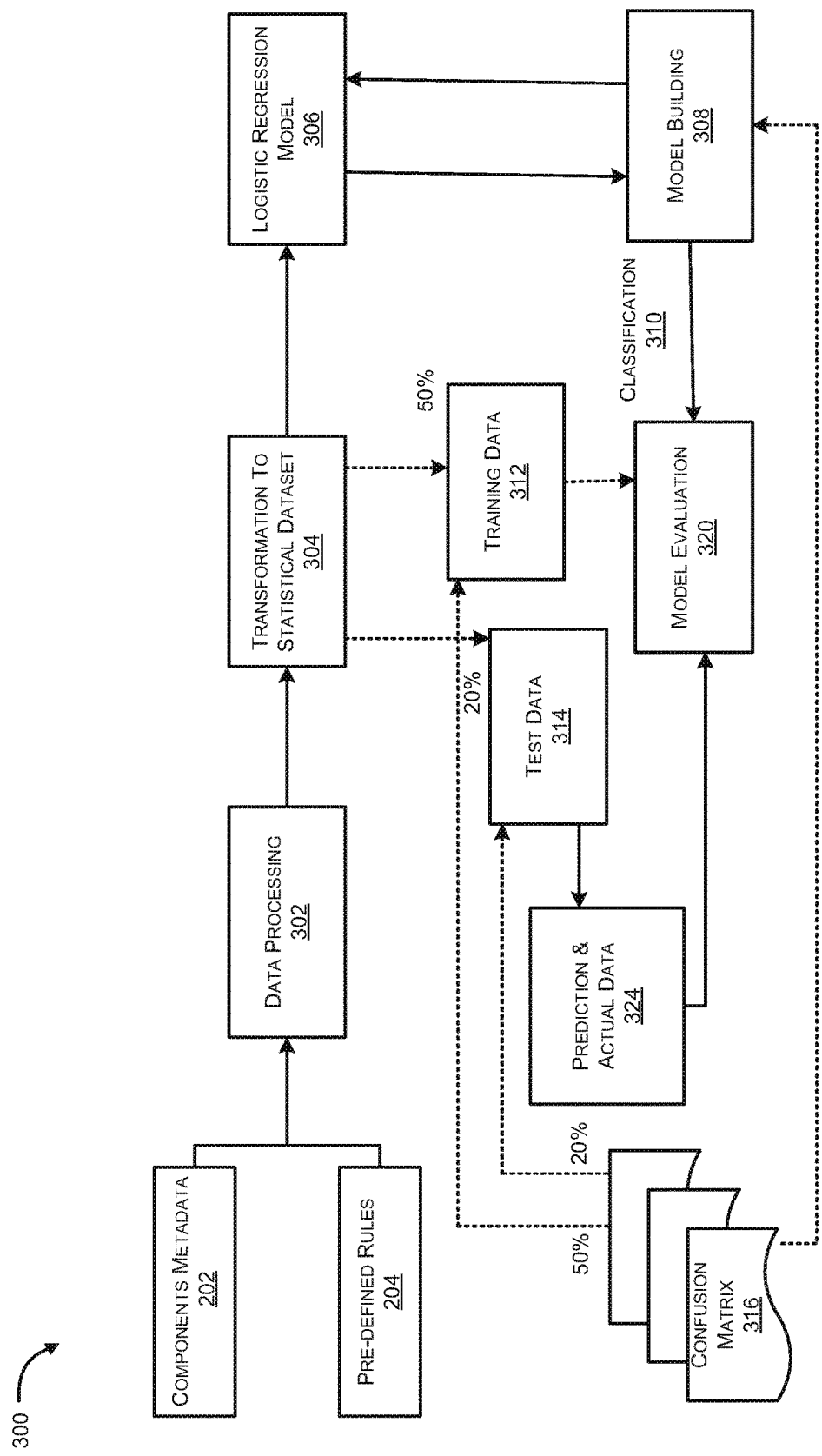
FIG. 3A illustrates an exemplary representation for validation of input dataset, according to an example embodiment of the present disclosure.

FIG. 3A illustrates an exemplary representation 300 showing steps involved in validation of input dataset, according to an example embodiment of the present disclosure. The input dataset (or component metadata) 202 and corresponding pre-defined rules 204 may be received by a data validator, based on which validation dataset may be obtained. In an example embodiment, the validation may be performed based on inter-relationship between different features pertaining to various corresponding features/components in component metadata. For example, the validation may be performed based on the following mathematical equation $$F_{createCollection}(I_{tool}) = \left\{ \begin{bmatrix} C'_1C'_1 & \cdots & C'_mC'_1 \\ \vdots & \ddots & \vdots \\ C'_1C'_m & \cdots & C'_mC'_m \end{bmatrix} \middle| m \in \mathbb{N}; m \text{ is the size of } I_{tool} \right\}$$

wherein $I_{tool} \subseteq C$ $$C = \{CPQ_{Products}, CPQ_{Attribute}, CPQ_{Object}\}$$

such that $$C'_iC'_j = \begin{cases} 1; & \text{if relation exists} \\ 0; & \text{if relation doesn't exists} \end{cases}$$

Thus, the above mentioned relations may be assumed to be valid if and only if there may exist a component $C'_j$ for a component $C'_i$, In this case, a valid collection of features/components may include $$\text{Valid}_{collection} = \left\{ \begin{pmatrix} C'_iC'_j \end{pmatrix} \middle| \begin{matrix} \forall C'_j \exists C'_i \\ C'_i, C'_j \in I_{tools} \\ C'_iC'_j = 1 \end{matrix} \right\}$$

whereas an invalid collection may include $$\text{Invalid}_{collection} = \left\{ \begin{pmatrix} C'_iC'_j \end{pmatrix} \middle| \begin{matrix} \forall C'_j \nexists C'_i \\ C'_i, C'_j \notin I_{tools} \\ C'_iC'_j = 1 \end{matrix} \right\}$$

In an example embodiment, pre-defined rules may not be satisfied due to any of the conditions:

For a component $C'_j$ there might not be any related/referenced component $C'_i$.

Any of components might not be a part of the given $I_{tools}$,

Or, any other failed validity defined as:

$$\langle \text{Invalid}_{collection} - (F_{createCollection}(I_{tool}) - \text{Valid}_{collection}) \rangle$$

The validation may be similarly considered based on the above covered mathematical equation for the below set of features/components {$CPQ_{Pricelist}$, $CPQ_{Pricebook}$, $CPQ_{Template}$}

{$CPQ_{Cards}$, $CPQ_{Pricelistentry}$, $CPQ_{Orchestrationitemdefinition}$, $CPQ_{Orchestrationplandefinition}$}

Referring to FIG. 3A, at 302, the input dataset or the component metadata 202 may be processed or pre-processed prior to the validation to obtain pre-processed dataset. This may be performed to ensure an appropriate form of the component metadata prior to further processing. For example, the pre-processing may include at least one of data cleaning, data lemmatization, removal of redundant data, and data splitting. The data lemmatization may include conversion of textual data of the component dataset into a base form of data. In general, the data lemmatization may include text normalization to reduce vocabulary small and remove the noise which helps to improve the accuracy of language modeling tasks. The data cleaning may refer to cleaning of textual data in the component metadata, based on a detected pattern. For example, a machine learning (ML) algorithm may be used for data cleaning. Similarly, removal of redundant data may include removal of repetitive words or words that occur too frequently to reduce redundancy of data and improve quality of information therein. The data splitting may facilitate division of the component dataset into a training dataset and a test dataset, which are shown in FIG. 3A as 312 and 314 respectively. The generation of these datasets may be useful for performing training and/or evaluation of the validation model used for validation and/or other models built for improvement of prediction accuracy.

Figure 3B:
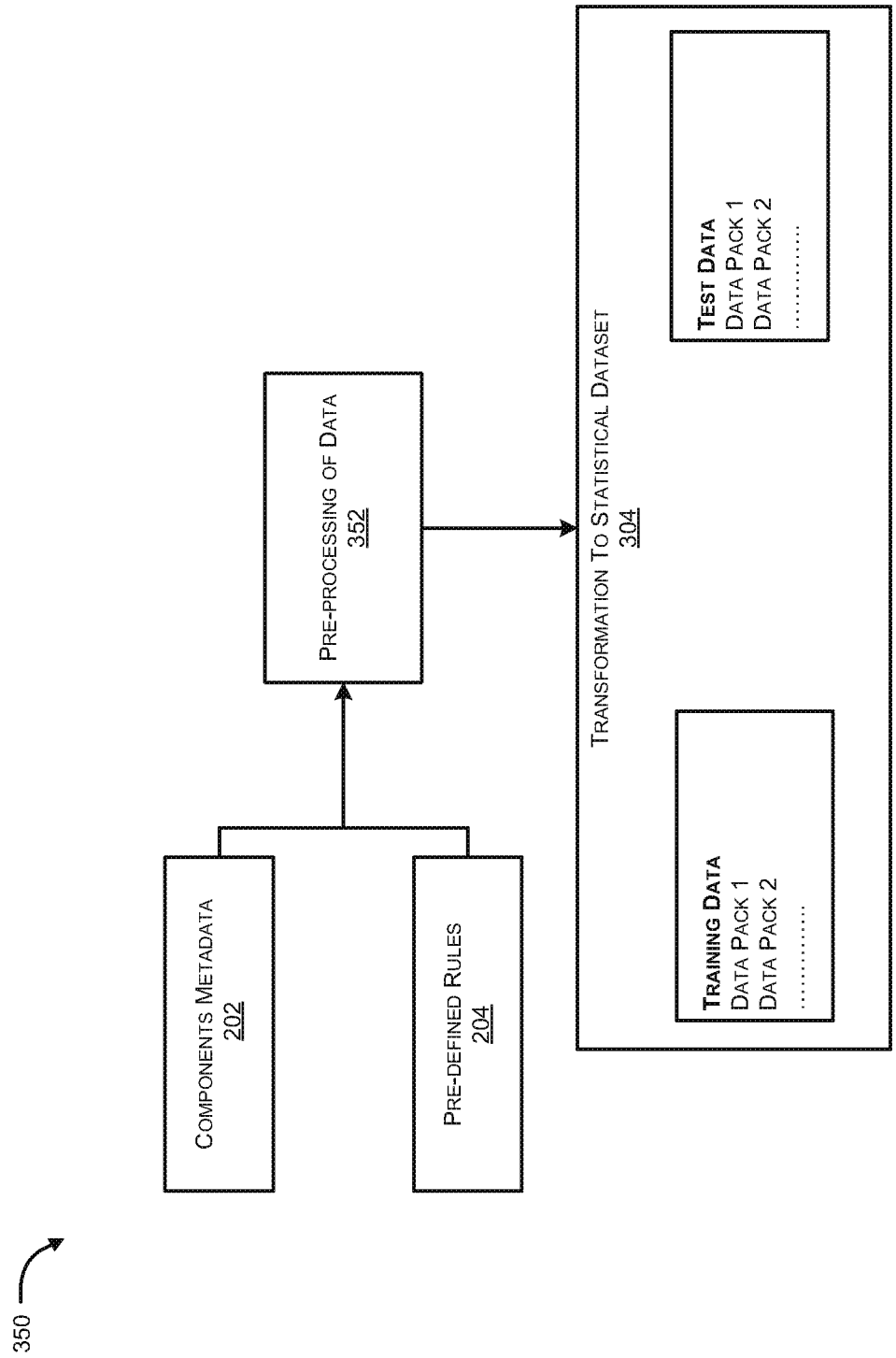
FIG. 3B illustrates an exemplary representation for pre-processing of input dataset, according to an example embodiment of the present disclosure.

FIG. 3B illustrates an exemplary representation 350 for pre-processing of input dataset, according to an example embodiment of the present disclosure. As illustrated in FIG. 3B at 352, input dataset including the component metadata 202 and corresponding pre-defined rules 204 may be pre-processed to obtain pre-processed dataset. As shown in FIGS. 3A-3B, at 304, the pre-processed dataset may be transformed to statistical dataset. As illustrated in FIG. 3, the statistical dataset may be divided through data splitting into training dataset and the testing data, wherein each dataset may be statistical form and may include independent data pack (labelled as data pack 1, data pack 2, . . . , and other data packs). In an example embodiment, the transformation to statistical dataset may be performed by using a term frequency-inverse document frequency (TF-IDF) based vectorization. The TF-IDF technique may mainly pertain to estimation of term frequency (TF) and inverse document frequency (IDF). The term frequency (TF) may be a measure of frequency of a word in a document, wherein TF is defined as the ratio of occurrence of the word in the document to the total number of words in the document. The IDF may be a measure of the importance of a word, wherein the IDF provides weightage to each word based on its frequency in a corpus. It may be noted that the term frequency may not consider the importance of words, such as, for example, 'of', 'and', and other such terms, which can be most frequently present but may be relatively lower significance. In an example embodiment, and as per the present implementation, the TF may pertain to ratio of number of times a word x may appear in a datapack file (such as JavaScript Object Notation (JSON) file) to the total number of word in the JSON file. Similarly, the IDF may pertain to $\log_e$ of a ratio of total number of JSON files to number of the JSON files in which a word may appear. The TF-IDF technique may thus enable to extract features from the processed dataset to convert them into numerical vector values to obtain the statistical dataset.

The statistical dataset may include numerical vector values corresponding to the plurality of components in the component dataset. In an example embodiment, using the statistical dataset, the validation may be performed by using a validation model, such as, for example, a logistic regression model 306. The validation may be performed based on a sigmoid function that may predict an outcome based on the classification including at least one valid feature or the at least one invalid feature. In an embodiment, numerical vector values exceeding the configurable threshold value may be classified into a first group corresponding to at least one valid feature. The numerical vector values that may be equal or lower than the configurable threshold value may be classified into a second group corresponding to the at least one invalid feature. For example, for a set threshold as 0.6, the validation may divide all values higher than 0.6 to be valid features and below than 0.6 to be invalid features. In an example, the validation may be performed by mapping the statistical dataset to sort the numerical vector values based on a configurable threshold value. In an example, the configurable threshold value may correspond to the pre-defined rules.

Figure 4A:
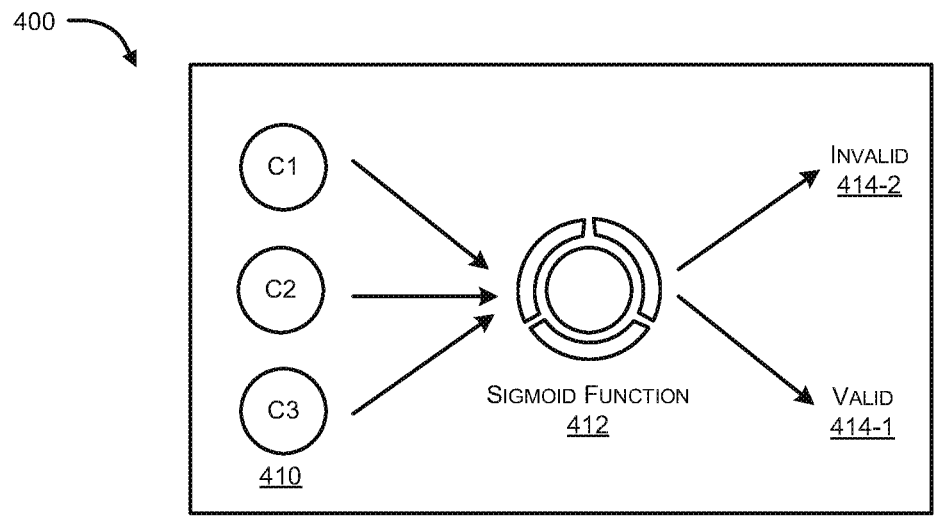
FIGS. 4A-4B illustrate exemplary representations for validation of features in a component metadata, according to an example embodiment of the present disclosure.
Figure 4B:
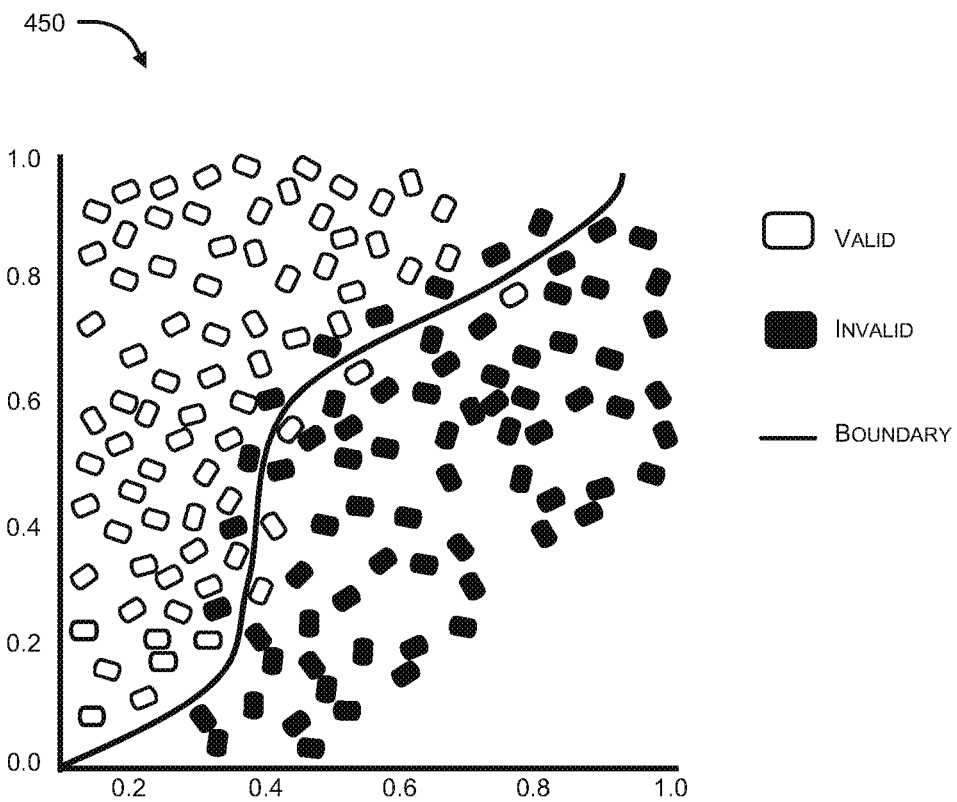

FIGS. 4A-4B illustrates an exemplary representation 400 and 450 respectively for validation of features in a component metadata, according to an example embodiment of the present disclosure. As illustrated in 400 (FIG. 4A), for a set of features 410 of the components including C1, C2, C3, and other features (not shown) in the component metadata, the validation model (logistic regression model), based on sigmoid function 412, may lead to classification of the features 410 as valid features 414-1 or invalid features 414-2. In an example, the classification thus executed may be binomial classification. The sigmoid function 412 may correspond to a mathematical function having a characteristic "S"-shaped curve or sigmoid curve as shown in 450 in FIG. 4B. As the logistic regression may expect the output as 0 or 1, the sigmoid function may be utilized to map a real value into another value between 0 and 1 such that the predicted value are mapped to probabilities. In an example embodiment, the sigmoid function 412 may be represented as:

$$S_{(z)} = \frac{1}{1+e^{-z}}$$

wherein, $S_{(z)}$=output between 0 and 1 (probability estimate); z=input to function (based on prediction by algorithm); and e=base of natural log.

As observed in the sigmoid curve in 450, the valid features and invalid features may be divided or distinguished by a boundary. Referring to FIG. 3A, based on the logistic regression model 306, the processor 102 may facilitate improvement in prediction accuracy pertaining to the validation by building a classification model 308. For example, the classification model 308 may be built by using random forest algorithm. In an example embodiment, the classification model may be further evaluated at 320, using a confusion matrix based algorithm 316. The evaluation may be performed based on the training dataset 312 and the test dataset 314 to facilitate assessment of a predicted validation result with respect to an actual validation result (shown as 308). In general, a confusion matrix pertains to a tabular data that may be used to describe performance of a classification model (or "classifier") on a set of test data for which the true values are known. The confusion matrix may represent number of results from predicted validation result and actual validation result. For example, based on the analysis using the confusion matrix, the outcome may be in form of output "TN" that may represent "True Negative" values pertaining to number of negative examples classified accurately. Another outcome may be in a form of "TP" that may represent "True Positive" value pertaining to number of positive examples classified accurately. Another outcome may be in form of "FP" that may represent "False Positive" value pertaining to number of actual negative examples classified as positive. Another outcome may be in form of "FN" that may represent "False Negative" value pertaining to number of actual positive examples classified as negative.

Figure 5A:
Figure 5B:
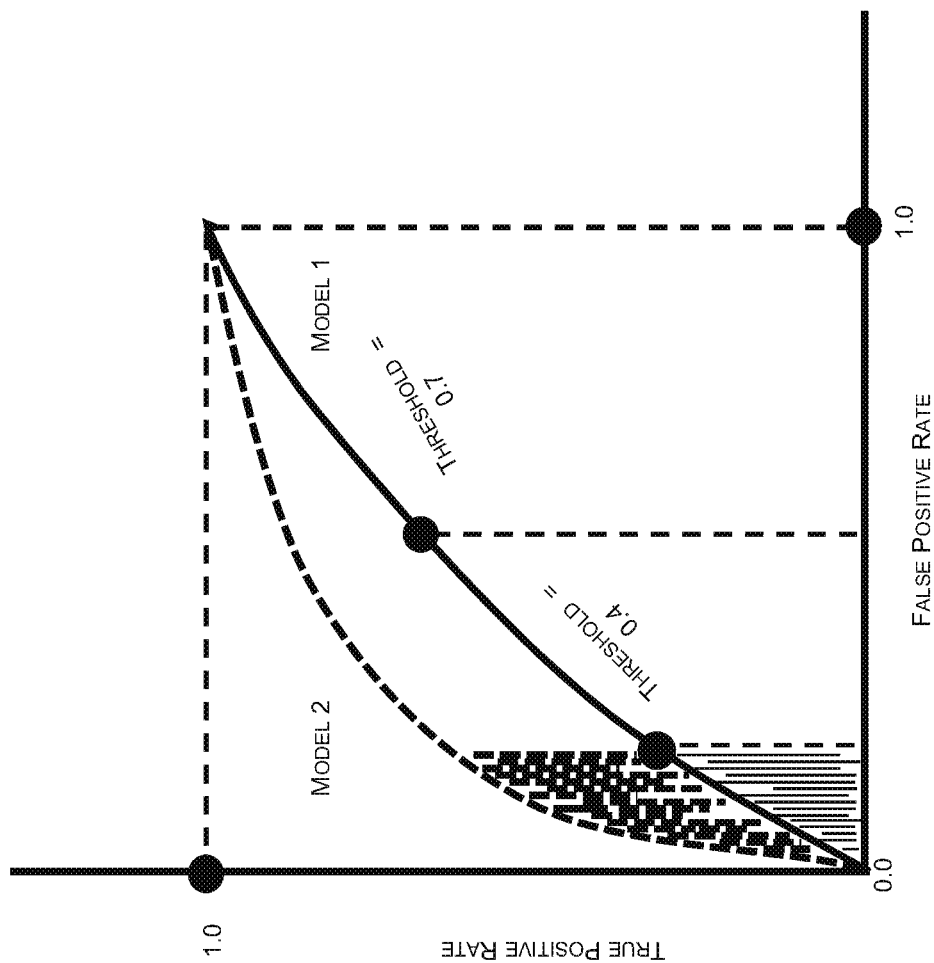

FIGS. 5A-5C illustrate exemplary representations 500, 520 and 530 respectively for evaluation based on confusion matrix, according to an example embodiment of the present disclosure. As illustrated in FIG. 5A, the classification model (or classifier) (308 in FIG. 3A) may predict the validation result based on a threshold value (such as 0.6 as shown in FIG. 5A). The classifier 308 may predict valid or invalid feature based on whether the predicted results are above or below the threshold. For example, the second entry is valid as the predicted result is above the threshold of 0.6, whereas the third entry is invalid as the predicted result is below the threshold of 0.6. As shown in 520 in FIG. 5B, based on the model being evaluated (such as for example, model 1 and model 2) and based on the corresponding threshold, a graph of true positive (TP) rate and false positive (FP) rate may be obtained. The graphical trend for the model 1 and model 2 may vary accordingly as shown in 520. The classification may be assessed based on specific metrics or assessment factors such as recall (½), Precision (⅔) and Accuracy (4/7), which are derived based on respective values as shown in the table in FIG. 5A. In an example embodiment, the recall, precision and accuracy may be mathematically represented as:

$$\text{Recall} = \frac{TP}{TP + FN}$$

$$\text{Precision} = \frac{TP}{TP + FP}$$

$$\text{Accuracy} = \frac{TP + TN}{\text{Total}}$$

$$\text{Total} = TP + TN + FP + FN$$

wherein TP is true positive, TN is true negative, FP is false positive and FN is false negative.

The accuracy of model may be evaluated through the confusion matrix to arrive at a value of 4/7 as shown in FIG. 5A. Similarly, other metrics such as, for example, precision and recall may be evaluated as ⅔ and ½ respectively. In another example, as depicted in 530 in FIG. 5C, for a total number of 511 component/features (prediction as valid/invalid features), the classifier model may have shown 471 results as valid whereas only 450 results were true positive and 21 were found to be false positive through the evaluation based on confusion matrix. Similarly, remaining 40 results (out of 511) were found to be invalid, whereas it was evaluated that out of 40 features, 10 results were predicted as false negative and only 30 were shown as true negative. Thus based on the confusion matrix, the classifier model can be evaluated to improve prediction accuracy of the classifier model to reduce the occurrence of false positive and false negative results. It may be appreciated that the mentioned examples are only exemplary and several other examples/embodiments are possible.

Figure 6B:
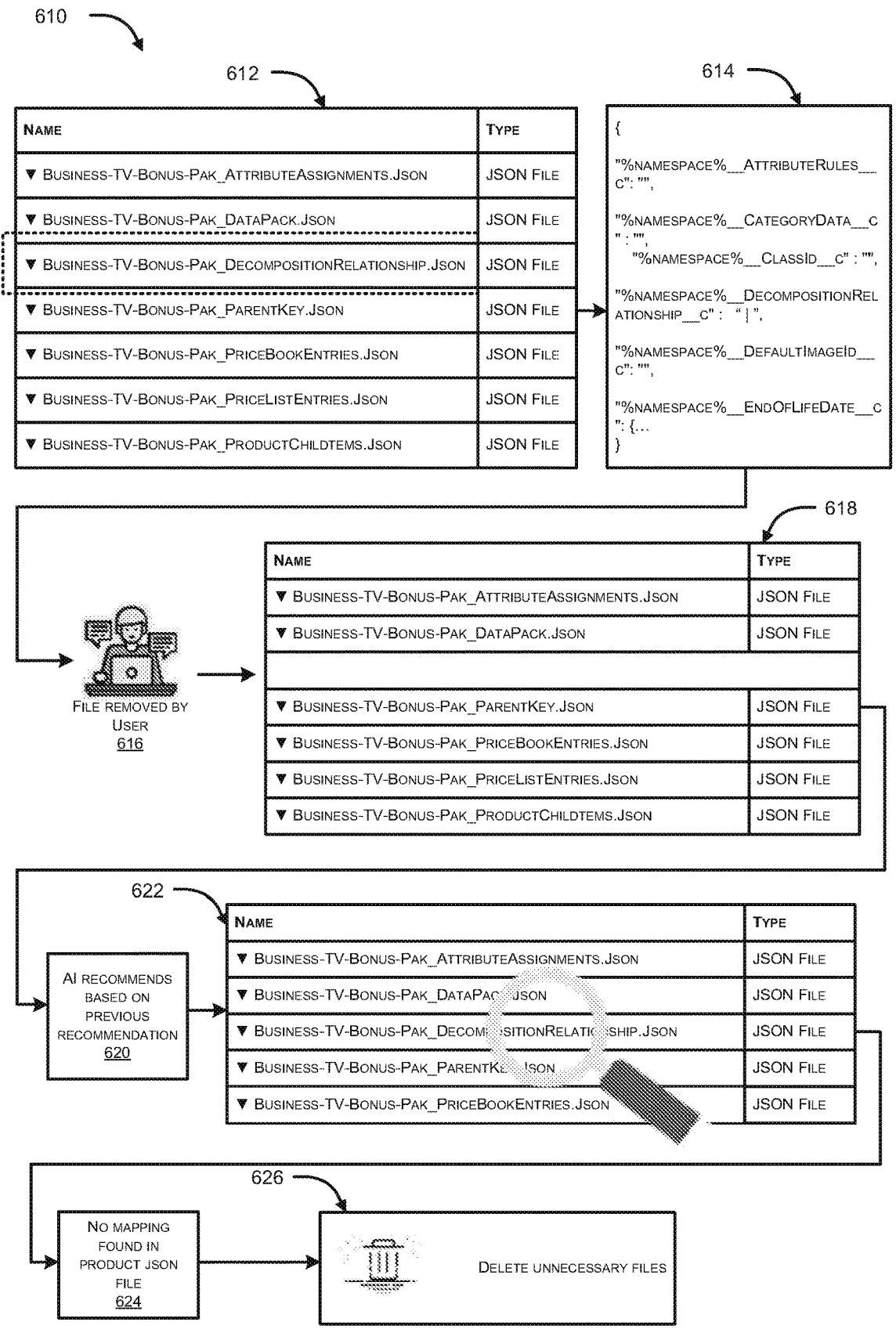
Figure 6C:
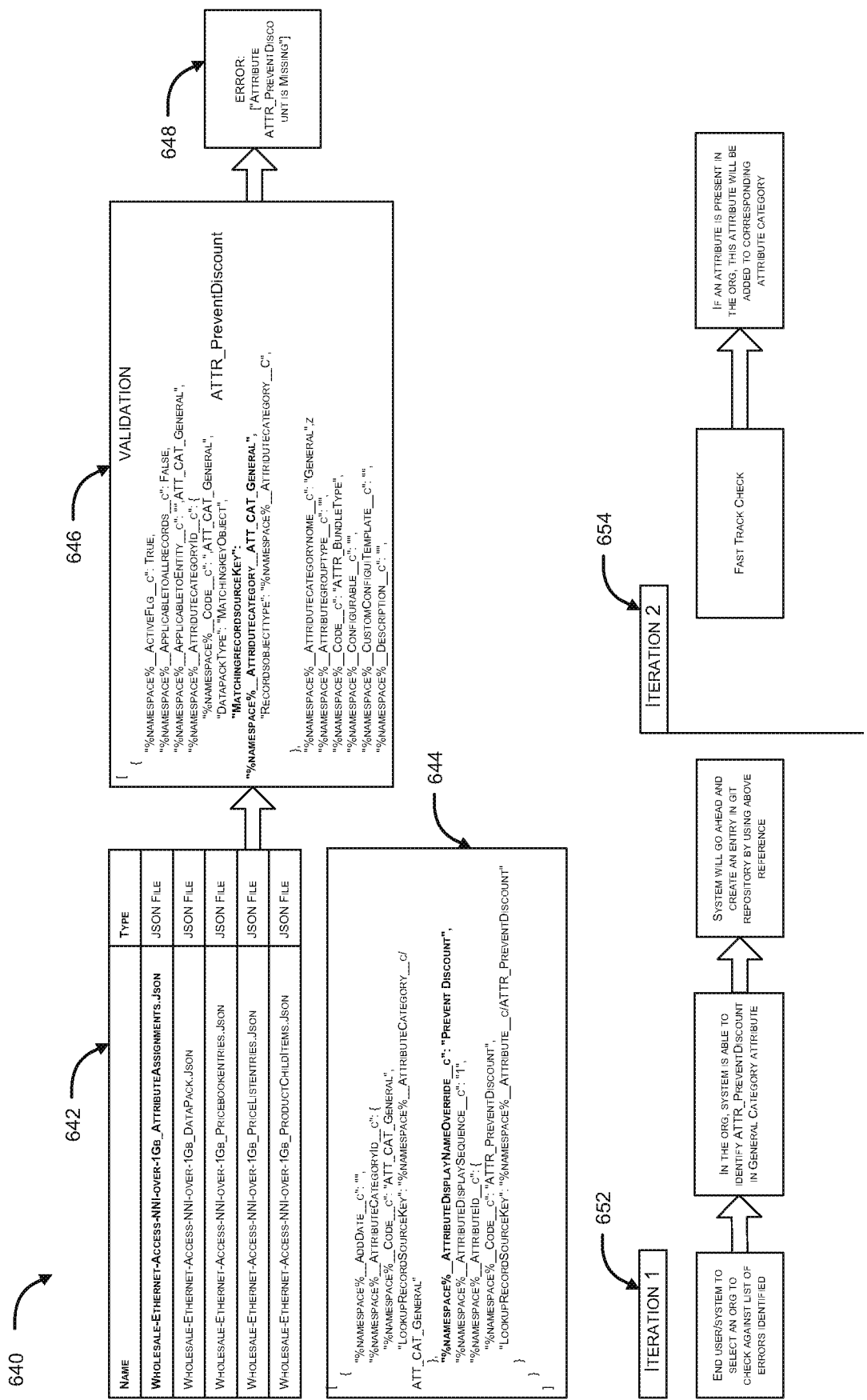

In an example embodiment, the insight generator 106 may generate automated insights pertaining to mitigation of the at least one invalid feature. FIGS. 6A-6C illustrate exemplary representations 600, 610 and 640 respectively, showing examples for mitigation of the invalid feature based on insights, according to an example embodiment of the present disclosure. As illustrated in FIG. 6A, a folder 602 may store multiple input datasets, wherein each input dataset may include a component metadata file 604 in the form of, for example, JSON file. As shown in 604, the JSON file 604 may indicate a missing feature (such as, for example, Product decomposition relationship), which may occur as an invalid feature at the time of deployment. In an example embodiment, the insight generator may generate an automated insight that may indicate addition of an available file to replace the missing feature in the JSON file as shown in 606 and 608. In an example embodiment, the insight generator may include a machine learning (ML) model that may map the missing feature (potential invalid feature) with the available feature in the database to facilitate the mitigation of the invalid feature.

In an example embodiment, for binomial classification, a logistic regression model may be used as expressed mathematically as shown below:

$$y = \frac{e^{(a+rx)}}{1 + e^{(a+rx)}}$$

wherein y is the predicted output;
a is the bias or intercept term; and
r is the coefficient (corresponding to weight) for the single input value (x).

In alternate examples, for categorical classification, random forests algorithm may be used, which may be expressed mathematically as:

$$y = 1 - \sum_{i=1}^{n}(P_i)^2 = 1 - [(P_+)^2 + (P_-)^2]$$

wherein $P_+$ is the probability of a positive class and $P_-$ is the probability of a negative class.

Further, as shown in 610 in FIG. 6B, a folder 612 may store multiple input datasets, wherein each input dataset may include a component metadata file 614 in the form of, for example, JSON file. The folder 612 may indicate a particular JSON file (such as, for example, corresponding to Product decomposition relationship), which may have been deleted by a user 616 as per historical data, which is as shown in folder 618 (obtained after deletion of the corresponding file). However, it may happen that the missing file or component data (or feature) may occur as invalid file at the stage of deployment. The insight generator may evaluate changes performed based on a previous recommendation by the user. Hence, at 624 based on the historical data, the insight generator may evaluate an existing folder 622 and provide a recommendation. In an example embodiment, the insight generator may include an artificial intelligence (AI) model (ML model) to evaluate the folder based on mapping to check if any corresponding deleted files are present in the database. If no such files are obtained, the insight generator may delete corresponding unnecessary files based on previous recommendation. In an example embodiment, supervised learning algorithm may be used for training the AI or ML models on datasets using labeled data. For example, for binomial classification, logistic regression model may be employed and for regression, random forests algorithm may be used (as described earlier).

As illustrated in 640 in FIG. 6C, a folder 642 may store multiple input datasets, wherein each input dataset may include a component metadata file 644 in the form of, for example, JSON file. Based on validation as shown in 646, the system may identify if any of the features/components in the component metadata is missing in the local repository. If a feature (such as, for example, ATTR_PreventDiscount) is found to be missing then an error message may displayed as illustrated in 648. To mitigate the error, an iteration 1 may be performed as shown in 652, wherein end user or system (or insight generator) may select an external source such as a source system (org) to check the external source against the list of identified errors. The term "org" may correspond to source systems where the components may reside or may be built such that these systems may act as a source of truth. In alternate example, the external source may also be any CPQ system on cloud-based system. Upon checking the database, the system may be able to identify "ATTR_PreventDiscount" in the general category features (or attributes). Based on the identified feature, the system may create an entry in the repository by using the identified reference in the external database. In another iteration as shown in 654, the system may perform a fast track check and if a missing feature is present in an external database then the feature may be added to the corresponding feature category.

Figure 7:
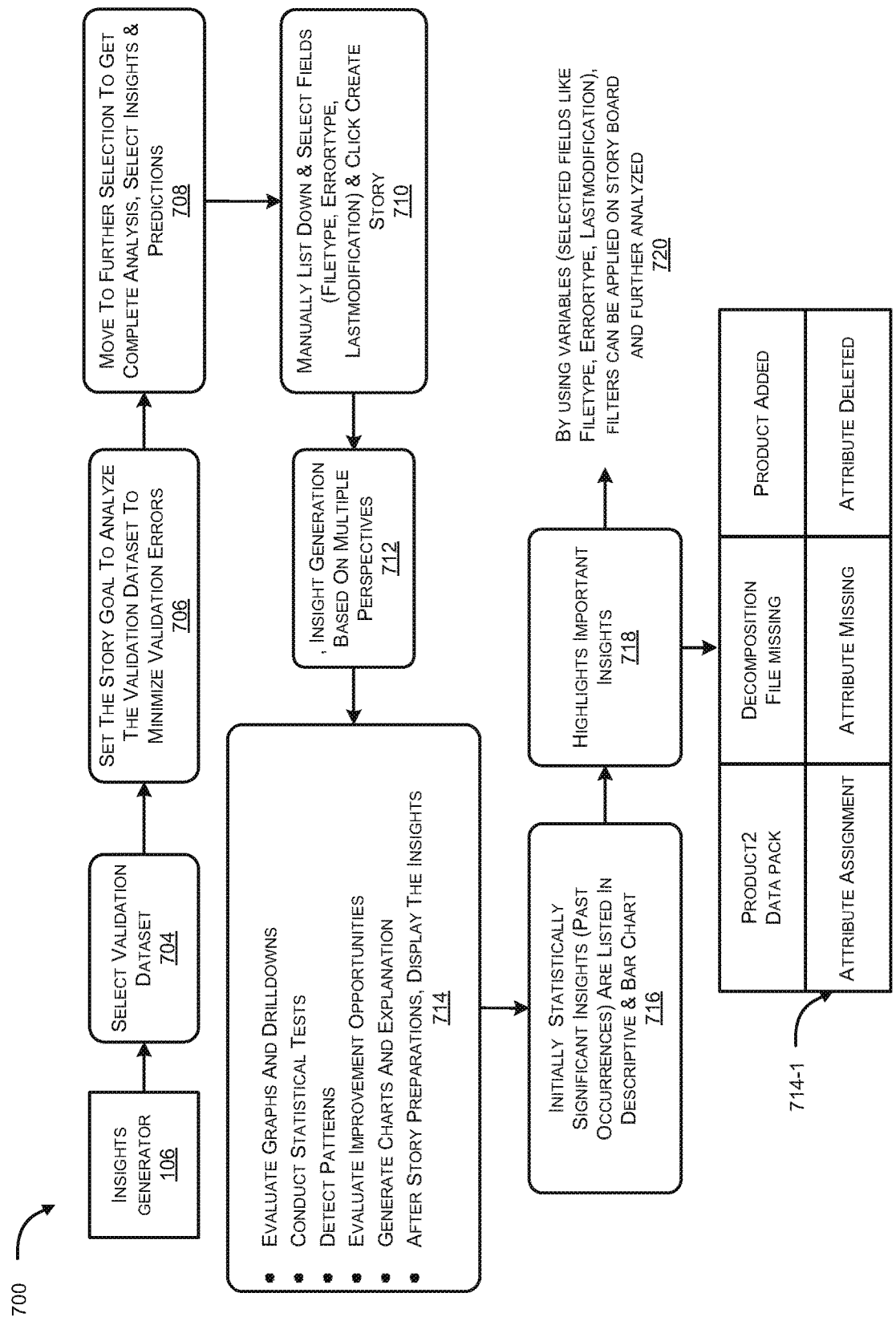
FIG. 7 illustrates an exemplary representation showing one or operational steps associated with insight generator, according to an example embodiment of the present disclosure.

In an example embodiment, the automated insights are generated in form of a summarized story that is generated by evaluating the validation dataset based on multiple perspectives. The summarized story may include statistical insights with respect to historical data. In an example embodiment, the summarized story includes at least one of descriptive text or graphical trend based projection. FIG. 7 illustrate an exemplary representation 700 showing one or operational steps associated with insight generator, according to an example embodiment of the present disclosure. As shown in FIG. 7, at 704, the insight generator 106 may receive (or select) a validation dataset. At 706, using a corresponding interface, a user may be able to select a group of available options to set a story goal, based on which the insight generator 106 may analyze the validation dataset so as to mitigate or else minimize the validation errors (invalid feature). At 708, the insight generator 106 may enable to progress to further selection to get complete analysis, wherein in a corresponding interface, an option to generate "insights and prediction" is generated. At 710, the interface may allow a user to manually list down and/or select various fields such as file type, error type, last modification, based on which a user may be able to select an option of "create story" for generation of the summarized story by the insight generator. At 712, the insight generator 106 may perform the insights generation by evaluating the validation dataset based on multiple perspectives. As illustrated in 714, insight generation may be performed using multiple ways/steps such as, for example, by evaluation of graphs, conducting statistical tests, detection of patterns, evaluation of improvement opportunities, generation of charts and explanation. Based on this, a summarized story may be prepared for displaying the insights. As shown in 716, the insight generator may initially state statistical insights (based on historical data) may be listed in the descriptive summary and the bar chart. At 718, the insight generator 106 may highlight important insights. For example as shown in 714-1, the important insights may include details of component metadata (such as Product2_DataPack and Attribute assignment) and corresponding invalid features (such as missing features including "Decomposition File missing" and "Attribute Missing"). Based on the type of mitigation that may be applicable, the insights may recommend/perform addition or deletion of the invalid feature. At 720, a further analysis may be performed by the insight generator. This may be performed by use of variables such as selected fields like file type, error type, last modification. The further analysis may be enabled by applying the necessary filters on the story board.

Figure 8:
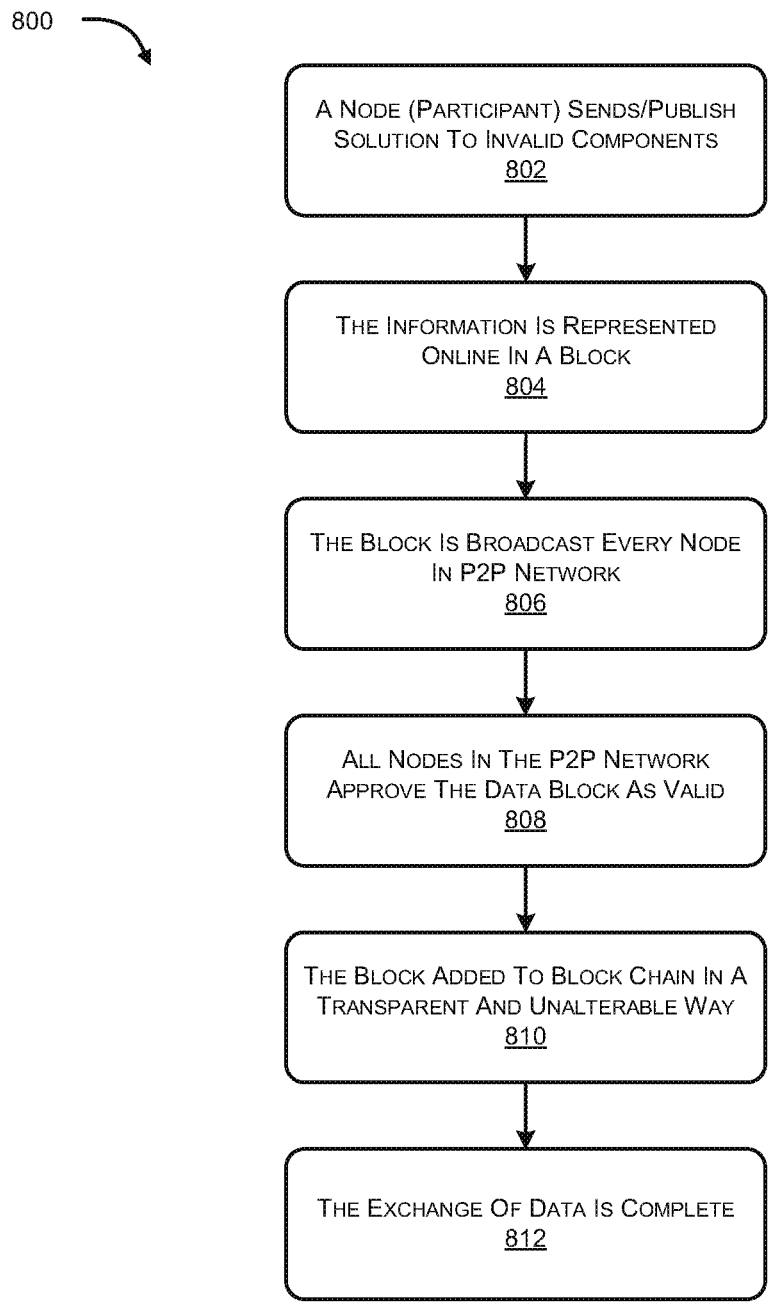
FIG. 8 illustrates an exemplary representation showing steps involved in authenticated storage of automated insights, according to an example embodiment of the present disclosure.

FIG. 8 illustrate an exemplary representation 800 showing steps involved in authenticated storage of automated insights, according to an example embodiment of the present disclosure. As shown in FIG. 8, at 802, in a network including plurality of nodes associated with a blockchain implementation including multiple authenticated blocks, a node (or participant) may send or publish information including a possible or implemented solution to invalid features in a component metadata. In an example embodiment, the solution may correspond to automated insights or predictions generated by the insight generator. At 804, the information may be represented online in a new block. At 806, the block may be broadcast to every node in the network. At 808, all nodes in the network may approve the block as valid. At 810, the block may be added to block chain in a transparent and unalterable way. At 812, the exchange of data may be considered to be complete. In an example, the automated insights or predictions on identified errors may be shared with all nodes, such as, for example, every node host ledger and smart contracts in a blockchain through blocks. For example, each block may include information that may be encrypted using an authoring contract. A publishing node (of the nodes in the network) may create a block to convey a new message contract address to other nodes such that subscribed nodes may be able to access the content at that address, for example, through a web interface. The new block may need approval or authorization from the other nodes prior to its addition as a block in the blockchain. In an example, the decision to add the block to the block chain may be made by consensus using smart contracts. It may be appreciated that the manner or sequence of the mentioned steps are exemplary.

Figure 9:
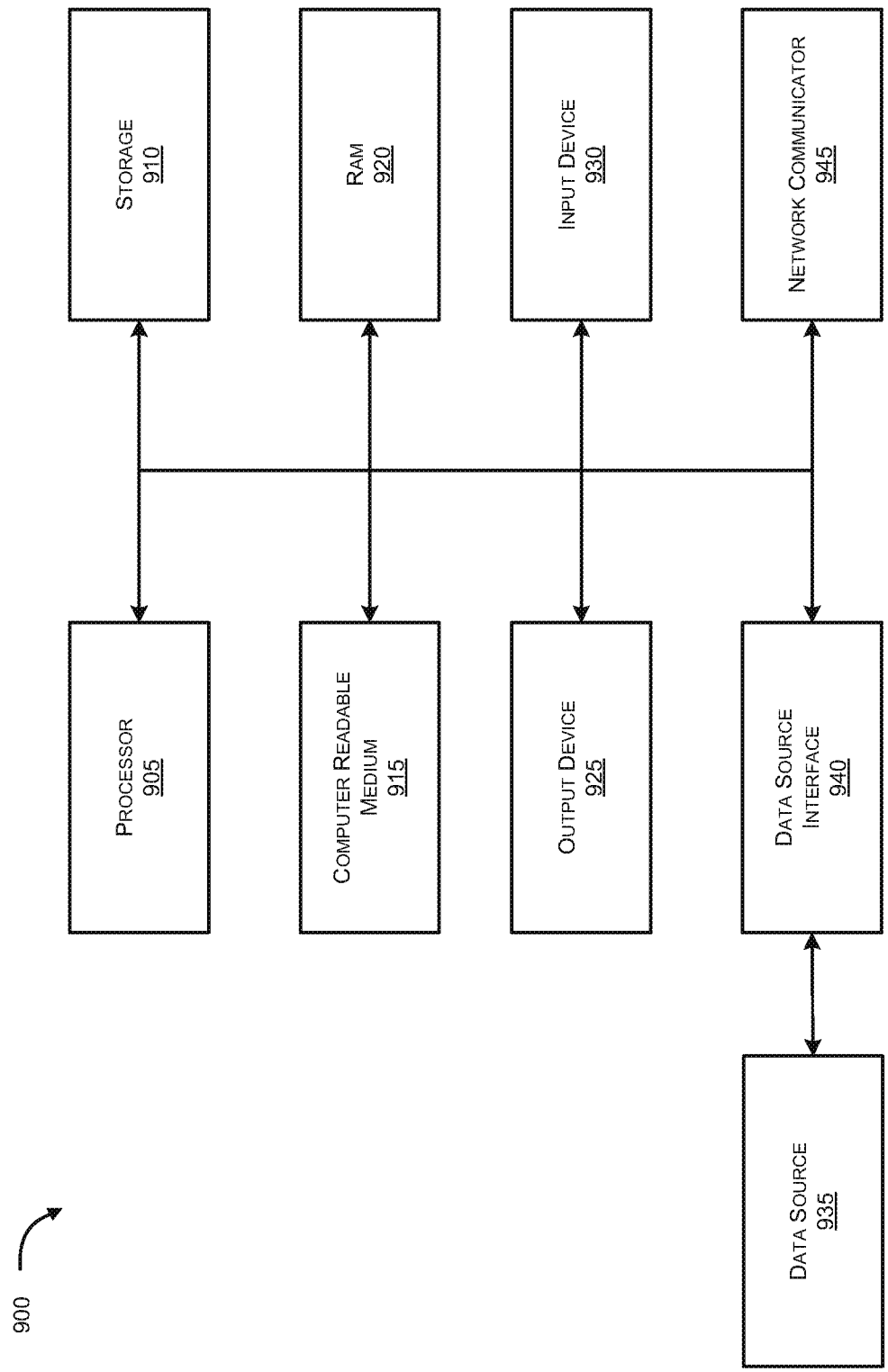
FIG. 9 illustrates a hardware platform for implementation of the disclosed system, according to an example embodiment of the present disclosure.

FIG. 9 illustrates a hardware platform (900) for implementation of the disclosed system, according to an example embodiment of the present disclosure. For the sake of brevity, construction and operational features of the system 100 which are explained in detail above are not explained in detail herein. Particularly, computing machines such as but not limited to internal/external server clusters, quantum computers, desktops, laptops, smartphones, tablets, and wearables which may be used to execute the system 100 or may include the structure of the hardware platform 900. As illustrated, the hardware platform 900 may include additional components not shown, and that some of the components described may be removed and/or modified. For example, a computer system with multiple GPUs may be located on external-cloud platforms including Amazon Web Services, or internal corporate cloud computing clusters, or organizational computing resources, etc.

The hardware platform 900 may be a computer system such as the system 100 that may be used with the embodiments described herein. The computer system may represent a computational platform that includes components that may be in a server or another computer system. The computer system may execute, by the processor 905 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 905 that executes software instructions or code stored on a non-transitory computer-readable storage medium 910 to perform methods of the present disclosure. The software code includes, for example, instructions to generate the validation datasets and the corresponding automated insights. In an example, the data validator 104, the insight generator 106, and the storage engine may be software codes or components performing these steps.

The instructions on the computer-readable storage medium 910 are read and stored the instructions in storage 915 or in random access memory (RAM). The storage 915 may provide a space for keeping static data where at least some instructions could be stored for later execution. The stored instructions may be further compiled to generate other representations of the instructions and dynamically stored in the RAM such as RAM 920. The processor 905 may read instructions from the RAM 920 and perform actions as instructed.

The computer system may further include the output device 925 to provide at least some of the results of the execution as output including, but not limited to, visual information to users, such as external agents. The output device 925 may include a display on computing devices and virtual reality glasses. For example, the display may be a mobile phone screen or a laptop screen. GUIs and/or text may be presented as an output on the display screen. The computer system may further include an input device 930 to provide a user or another device with mechanisms for entering data and/or otherwise interact with the computer system. The input device 930 may include, for example, a keyboard, a keypad, a mouse, or a touchscreen. Each of these output device 925 and input device 930 may be joined by one or more additional peripherals. For example, the output device 925 may be used to display the automated insights that is generated by the system 100.

A network communicator 935 may be provided to connect the computer system to a network and in turn to other devices connected to the network including other clients, servers, data stores, and interfaces, for instance. A network communicator 935 may include, for example, a network adapter such as a LAN adapter or a wireless adapter. The computer system may include a data sources interface 940 to access the data source 945. The data source 945 may be an information resource. As an example, a database of exceptions and rules may be provided as the data source 945. Moreover, knowledge repositories and curated data may be other examples of the data source 945.

Figure 10:
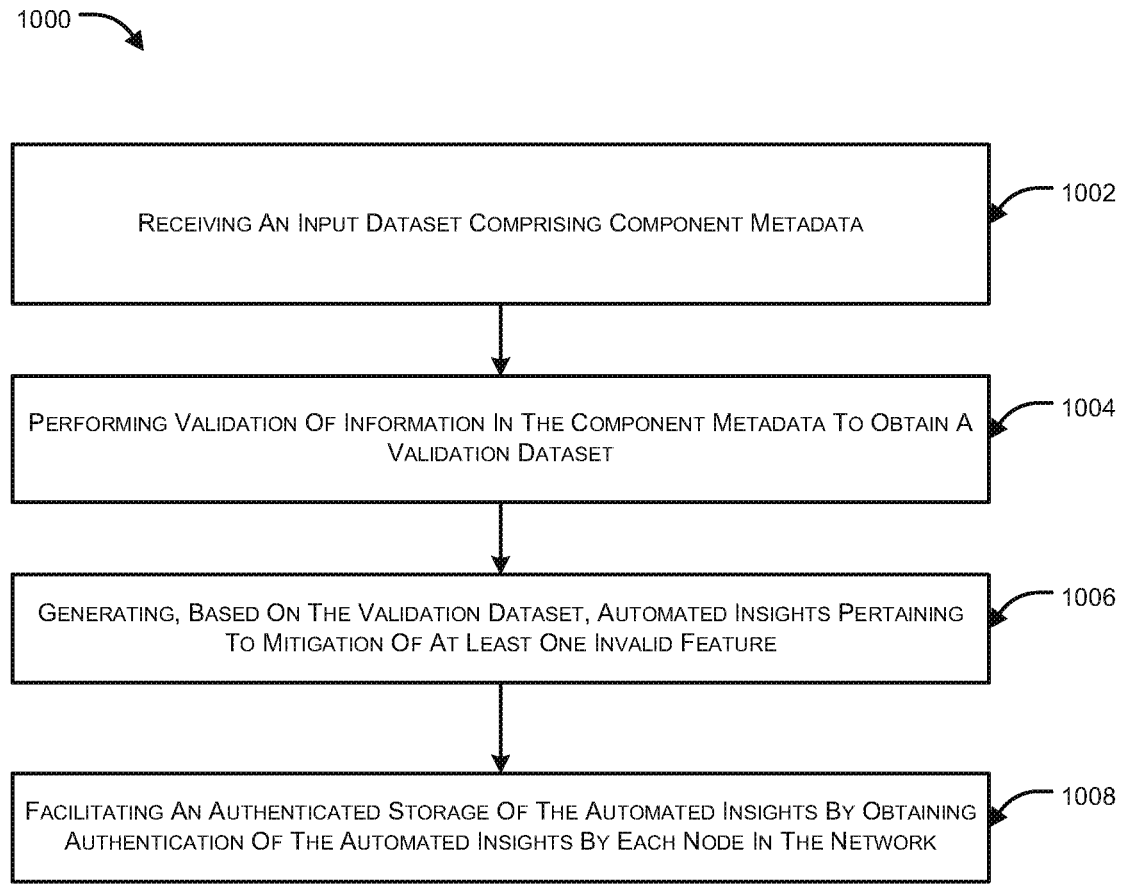
FIG. 10 illustrates a flow diagram for facilitating validation of datasets, according to an example embodiment of the present disclosure.

FIG. 10 illustrates a flow diagram 1000 for facilitating validation of datasets, according to an example embodiment of the present disclosure. At 1002, the method includes a step of receiving an input dataset comprising a component metadata. In an embodiment, the component metadata may include information pertaining to a feature corresponding to each component of a plurality of components associated with a product or a service. At 1004, the method includes a step of performing, by the processor, validation of the information in the component metadata to obtain a validation dataset. In an example embodiment, the validation may be performed through assessing the feature with respect to a pre-defined rule stored in the rules engine. The validation may enable to identify at least one invalid feature in the component dataset. At 1006, the method includes a step of generating, by the processor, based on the validation datasets, automated insights pertaining to mitigation of the at least one invalid feature. In an example embodiment, the automated insights may be stored in a distributed ledger to facilitate an authenticated storage of the automated insights. The authenticated storage may be facilitated by a network comprising plurality of nodes. At 1108, the method includes a step of facilitating, by the processor, the authenticated storage by obtaining authentication of the automated insights by each node in the network.

In an example embodiment, the method may include a step of pre-processing, by the processor, the input dataset prior to the validation to obtain pre-processed dataset. The pre-processing may include at least one of data cleaning, data lemmatization, removal of redundant data or data splitting. In an embodiment, the pre-processed data may be transformed to a statistical dataset. The transformation may be performed using term frequency-inverse document frequency (TF-IDF) based vectorization to obtain the statistical dataset comprising numerical vector values corresponding to the plurality of components in the component dataset. In an example embodiment, the validation may be performed through mapping the statistical dataset to sort the numerical vector values based on a configurable threshold value corresponding to the pre-defined rules. The numerical vector values exceeding the configurable threshold value may be classified into as a first group corresponding to at least one valid feature. The numerical vector values that are equal or lower than the configurable threshold value may be classified into a second group corresponding to the at least one invalid feature.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

We claim:
1. A system comprising:
a processor coupled with a memory, wherein the memory stores instructions to be executed by the processor:
a data validator implemented via the processor to:
receive an input dataset comprising a component metadata, wherein the component metadata includes information pertaining to a feature corresponding to each component of a plurality of components associated with a product or a service;
perform, using a validation model and through a rules engine, validation of the information in the component metadata to obtain a validation dataset, wherein the validation is performed by assessing the feature with respect to a corresponding pre-defined rule stored in the rules engine, and wherein the validation enables to predict at least one invalid feature in the component dataset; and
an insight generator implemented via the processor to:
generate, based on the validation datasets, automated insights pertaining to mitigation of the at least one invalid feature;
wherein the automated insights are stored in a distributed ledger to facilitate an authenticated storage of the automated insights, and wherein the authenticated storage is facilitated by a network comprising a plurality of nodes.

2. The system as claimed in claim 1, wherein the system comprises a storage engine, implemented by the processor, to facilitate the authenticated storage of the automated insights in the distributed ledger, wherein the distributed ledger pertains to a blockchain implementation comprising storage of the automated insights in a form of multiple authenticated blocks.

3. The system as claimed in claim 2, wherein the authenticated storage comprises an authentication of the automated insights by each node in the network.

4. The system as claimed in claim 1, wherein the component pertains to at least one of a product type, a price, an attribute and an orchestration pertaining to at least one of the product, and the service, and wherein the component metadata pertains to a configure, price and quote (CPQ) operation.

5. The system as claimed in claim 1, wherein the input dataset is pre-processed prior to the validation to obtain pre-processed dataset, and the pre-processing comprising at least one of data cleaning, data lemmatization, removal of redundant data, and data splitting.

6. The system as claimed in claim 5, wherein the data lemmatization comprises conversion of textual data of the component dataset into a base form of data, and wherein the data splitting facilitates division of the component dataset into a training dataset and a testing dataset.

7. The system as claimed in claim 5, wherein the pre-processed data is transformed to a statistical dataset, and wherein the transformation is performed using term frequency-inverse document frequency (TF-IDF) based vectorization to obtain the statistical dataset comprising numerical vector values corresponding to the plurality of components in the component dataset.

8. The system as claimed in claim 1, wherein the validation is performed by mapping the statistical dataset to sort the numerical vector values based on a configurable threshold value corresponding to the pre-defined rules, wherein numerical vector values exceeding the configurable threshold value are classified into a first group corresponding to at least one valid feature, and numerical vector values that are equal or lower than the configurable threshold value are classified into a second group corresponding to the at least one invalid feature.

9. The system as claimed in claim 8, wherein the validation is performed by a validation mode including a logistic regression model, and wherein the validation is performed based on a sigmoid function that predicts an outcome based on the classification including at least one valid feature or the at least one invalid feature.

10. The system as claimed in claim 8, wherein, based on the logistic regression model, the processor facilitates improvement in prediction accuracy pertaining to the validation by building a classification model using random forest algorithm.

11. The system as claimed in claim 10, wherein the classification model is evaluated using a confusion matrix based algorithm, and wherein the evaluation is performed based on the training dataset and the test dataset to facilitate assessment of a predicted validation result with respect to an actual validation result.

12. The system as claimed in claim 11, wherein the assessment is performed based on assessment factors including at least one of recall, precision, and accuracy.

13. The system as claimed in claim 1, wherein the automated insights are generated in a form of a summarized story that is generated by evaluating the validation dataset based on multiple perspectives, wherein the summarized story includes statistical insights with respect to historical data, and wherein the summarized story includes at least one of descriptive text and graphical trend based projection.

14. A method for facilitating validation of datasets, the method comprising:
receiving, by a processor, an input dataset comprising a component metadata, wherein the component metadata includes information pertaining to a feature corresponding to each component of a plurality of components associated with a product or a service;
performing, by the processor, validation of the information in the component metadata to obtain a validation dataset, wherein the validation is performed through assessing the feature with respect to a pre-defined rule stored in the rules engine, and wherein the validation enables to identify at least one invalid feature in the component dataset; and
generating, by the processor, based on the validation datasets, automated insights pertaining to mitigation of the at least one invalid feature;
wherein the automated insights are stored in a distributed ledger to facilitate an authenticated storage of the automated insights, and wherein the authenticated storage is facilitated by a network comprising a plurality of nodes.

15. The method as claimed in claim 14, wherein the method further comprises:
facilitating, by the processor, the authenticated storage by obtaining authentication of the automated insights by each node in the network,
wherein the distributed ledger pertains to a blockchain implementation comprising storage of the automated insights in a form of multiple authenticated blocks.

16. The method as claimed in claim 14, wherein the method further comprises:
pre-processing, by the processor, the input dataset prior to the validation to obtain pre-processed dataset, wherein the pre-processing comprises at least one of data cleaning, data lemmatization, removal of redundant data, and data splitting.

17. The method as claimed in claim 14, wherein the pre-processed data is transformed to a statistical dataset, and wherein the transformation is performed using term frequency-inverse document frequency (TF-IDF) based vectorization to obtain the statistical dataset comprising numerical vector values corresponding to the plurality of components in the component dataset.

18. The method as claimed in claim 14, wherein the validation is performed by mapping the statistical dataset to sort the numerical vector values based on a configurable threshold value corresponding to the pre-defined rules, wherein numerical vector values exceeding the configurable threshold value are classified into as a first group corresponding to at least one valid feature, and numerical vector values that are equal or lower than the configurable threshold value are classified into a second group corresponding to the at least one invalid feature.

19. A non-transitory computer readable medium, wherein the readable medium comprises machine executable instructions that are executable by a processor to:
receive an input dataset comprising a component metadata, wherein the component metadata includes information pertaining to a feature corresponding to each component of a plurality of components associated with a product or a service;
perform using a validation model and through a rules engine of the processor, validation of the information in the component metadata to obtain a validation dataset, wherein the validation is performed through assessing the feature with respect to a pre-defined rule stored in the rules engine, and wherein the validation enables to identify at least one invalid feature in the component dataset; and generate, based on the validation datasets, automated insights pertaining to mitigation of the at least one invalid feature;

wherein the automated insights are stored in a distributed ledger to facilitate an authenticated storage of the automated insights, and wherein the authenticated storage is facilitated by a network comprising a plurality of nodes.

20. The non-transitory computer readable medium as claimed in claim 19, wherein the readable medium comprises machine executable instructions that are executable by a processor to:

facilitate the authenticated storage by obtaining authentication of the automated insights by each node in the network.

* * * * *